Figure 1:
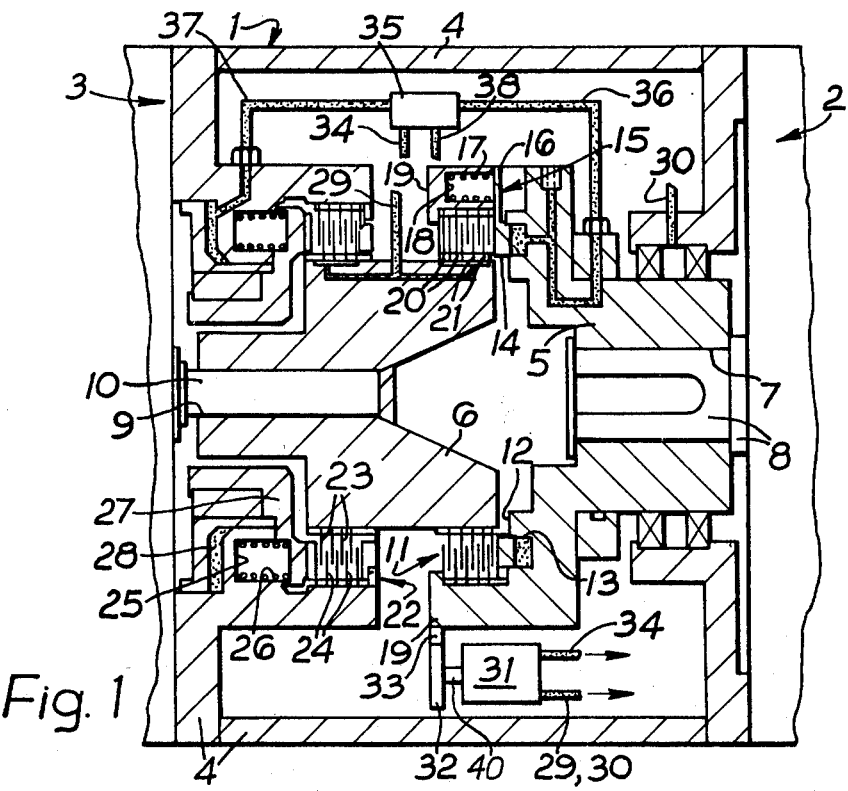

United States Patent [19]

Bottomley et al.

[11] 4,456,109
[45] Jun. 26, 1984

[54] TRANSMISSION COUPLING INCLUDING A CLUTCH-BRAKE COMBINATION

[75] Inventors: Eric Bottomley, Barnsley; Malcolm C. Foster, Wakefield, both of England

[73] Assignee: Fletcher Sutcliffe Wild Limited, England

[21] Appl. No.: 301,123

[22] Filed: Sep. 11, 1981

[51] Int. Cl.³ ............................................. B60K 41/24
[52] U.S. Cl. .................................. 192/18 A; 192/91 A
[58] Field of Search ................... 192/12 C, 15, 18 A, 192/91 R, 91 A; 60/452, 476, 464; 92/12.2

[56] References Cited

U.S. PATENT DOCUMENTS

| 2,153,056 | 4/1939 | West | 60/476 X |
| 2,716,995 | 9/1955 | Baugh et al. | 60/476 |
| 2,748,569 | 6/1956 | Jackson | 60/476 |
| 3,638,773 | 2/1972 | Lewis et al. | 192/18 A |
| 3,903,698 | 9/1975 | Gellatly et al. | 60/464 |
| 4,175,649 | 11/1979 | Monks | 192/18 A |
| 4,346,796 | 8/1982 | Ueno | 192/18 A |
| 4,381,647 | 5/1983 | Ruseff | 60/452 |

FOREIGN PATENT DOCUMENTS

| 804482 | 11/1958 | United Kingdom . |
| 1313309 | 4/1973 | United Kingdom . |
| 1341682 | 12/1973 | United Kingdom . |
| 1465834 | 3/1977 | United Kingdom . |
| 1552464 | 9/1979 | United Kingdom . |

Primary Examiner—George H. Krizmanich
Attorney, Agent, or Firm—King and Liles

[57] ABSTRACT

A transmission coupling 1 for location between an electric motor 2 and a gearbox 3, comprises a rigid housing 4, an input shaft 5 rotatably supported within the housing 4, an output shaft 6 also rotatably supported within the housing 4 and connectable to the input shaft 5 by operation of a hydraulically actuated, multi-plate clutch 11, the output shaft 6 also carrying some elements of a multi-plate brake 22, other elements being carried by the housing 4, the brake 22 being spring loaded into operative position and hydraulically displaceable into a non-operative position, a constant pressure pump 31 to provide hydraulic pressure fluid to effect operation of the clutch 11 and brake 22, in accordance with the fluid volume demanded by clutch and brake operation, the pump volume output automatically being adjusted in response to such demand, and at least one control valve 35 to control the flow of the hydraulic fluid to the working circuit 39.

16 Claims, 4 Drawing Figures

TRANSMISSION COUPLING INCLUDING A CLUTCH-BRAKE COMBINATION

This invention relates to a transmission coupling, particularly though not exclusively for transmitting drive to a conveyor.

Conventionally, drive to scraper chain conveyors commonly employed for instance in mining operations, is effected from an electric motor to a gearbox via fluid coupling which cushions the effect of payload on the motor at start-up of the conveyor, as the electric motors employed are invariably of the kind that immediately runs up to its design speed upon electric power being applied. With requirements for increased conveying capacities, electric motors of increased horse powers are employed but problems are encountered in satisfactorily preventing fluid couplings from overheating. Furthermore, when the electric motor is switched off, although the inherent friction in a scraper chain conveyor halts the latter within a few feet, irrespective of whether the conveyor is loaded or empty, the increasing use of crushers, for mineral comminuting purposes, has led to a requirement for conveyor braking facilities whereby the conveyor may be halted virtually instantaneously with the cut-off of electric power to the motor.

According to the present invention, a transmission coupling for location between an electric motor and a gearbox, comprises a rigid housing, an input shaft rotatably supported within the housing, an output shaft also rotatably supported within the housing and connectable to the input shaft by operation of a hydraulically actuated, multi-plate clutch, the output shaft also carrying some elements of a multi-plate brake, other elements being carried by the housing, the brake being spring loaded into operative position and hydraulically displaceable into a non-operative position, a constant pressure pump to provide hydraulic pressure fluid to effect operation of the clutch and brake, in accordance with the fluid volume demanded by clutch and brake operation, the pump volume output automatically being adjusted in response to such demand, and at least one control valve to control the flow of the hydraulic fluid to the working circuit.

Thus, the transmission coupling in accordance with the invention avoids the need for any fluid coupling, because the clutch may be gradually brought into use, by suitable control of the fluid flow rate, to ensure that the electric motor is gradually loaded, while the incorporation of a brake can ensure, through the electric control valves, that braking becomes operative immediately power to the electric motor is cut off, and furthermore, no unnecessary heat results from the need to dump excess pressure fluid, for no such excess is generated.

In detail, the input and output shafts are preferably co-axial. The input shaft may comprise a female formation adapted to receive a male output shaft from the electric motor, while the output shaft may also comprise a female formation to receive a male shaft from the gearbox. An inner face of the input shaft in a location adjacent the output shaft may be provided with a circumferential recess in which a piston ring is partially located, the ring being displaceable upon the admission of hydraulic fluid to the recess, to operate the clutch by displacing plates of friction material carried by an extension of the input shaft into contact with a plurality of axially spaced, annular plates carried by the output shaft, with which plates the friction plates are interleaved. The circumferential recess is also provided with a hydraulic seal, one side of which abuts the piston ring and the other side of which is subject to the action of the hydraulic fluid. Preferably, the clutch is spring loaded into a non-drive position, the hydraulic fluid needing to overcome this spring action before drive is possible. In detail, a plurality of circumferentially spaced pockets may be provided around an extension of the input shaft, each pocket housing a coil compression spring operable on the piston ring.

With regard to the brake, a plurality of coil compression springs may be located in a plurality of circumferentially spaced pockets in a portion of the housing, with brake plates of friction material carried by the carrier interleaved with a plurality of axially spaced, annular plates carried by the output shaft. The coil springs are operable against a piston which is displaceable with respect to the housing, whereby the springs may be compressed, to make the brake ineffective, upon the piston being displaced in a first direction by hydraulic fluid, exhaustion of the fluid enabling the springs to become operative for braking purposes, the fluid preferably being of a fire retardant type.

For ease of manufacture and assembly, elements of both the clutch and brake may be carried by respective face plates secured by drive pins to the input and output shafts respectively.

A slip ring may be located between the multi-plate clutch and the multi-plate brake for cooling fluid circulation purposes.

The control valves may be of an electrically or hydraulically operated type whereby they may be remotely operated, electric operation being particularly suitable for brake operation. The valves are also preferably of an intrinsically safe or flameproof type.

Conveniently, the hydraulic supply for both brake and clutch operation may be provided from a pump contained within the housing and driven by a pinion in mesh with a gear ring carried by the input shaft. This same pump may also provide the circulation cooling fluid for the clutch and brake.

Figure 2:
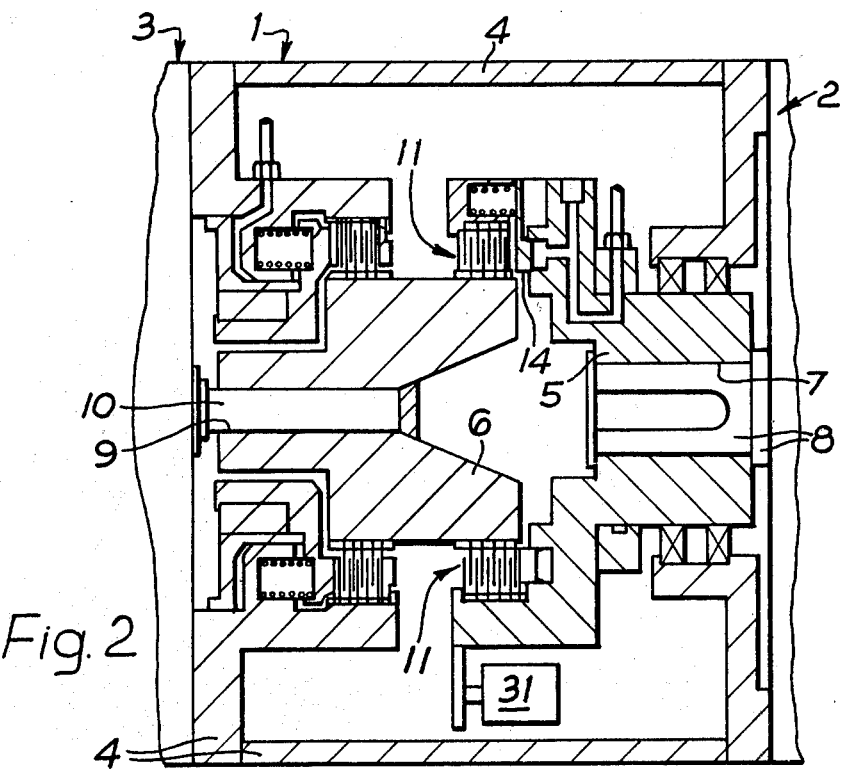
Figure 3:
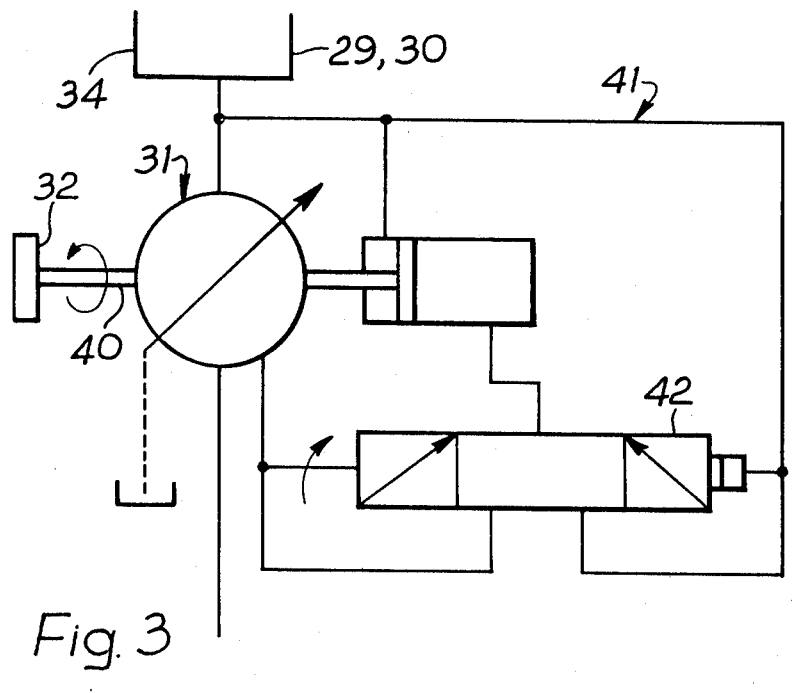

The invention will now be described in greater detail, by way of example, with reference to the accompanying drawings in which:

FIG. 1 is a diagrammatic sectional view through a transmission coupling in accordance with the present invention, showing the driving position;

FIG. 2 corresponds to FIG. 1 but shows the braking position;

FIG. 3 details the pump of FIGS. 1 and 2; and

Figure 4:
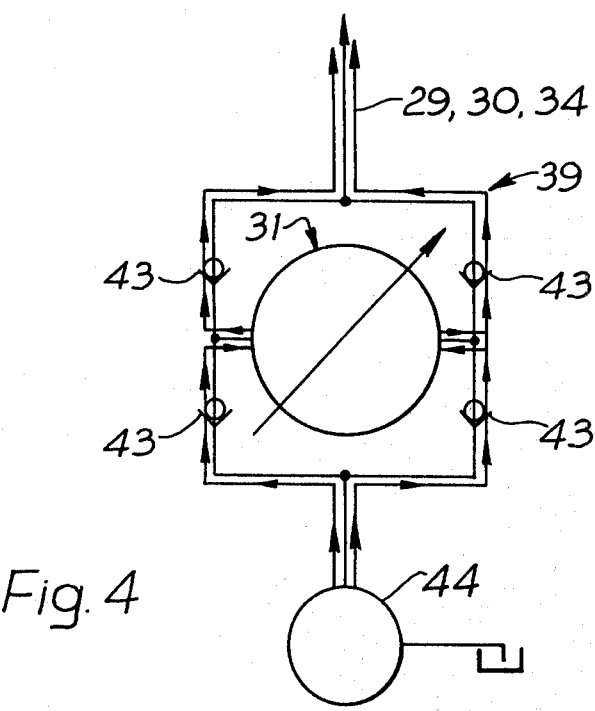

FIG. 4 shows a modified circuit for the pump.

In the drawings, a transmission coupling 1 is, in service, located between an electric motor partly indicated at 2 and a gearbox partly indicated at 3.

The coupling 1 comprises a rigid housing 4 which supports co-axially rotatably input and output shafts 5 and 6 respectively. The input shaft 5 comprises a female formation 7 adapted to receive a male output shaft 8, which may be splined, from the electric motor 2, while the output shaft 6 is similarly provided with a female formation 9 adapted to receive a male shaft 10 from the gearbox 3.

Drive or non-drive from the input shaft 5 to the output shaft 6 is effected by the operation or non-operation of a hydraulically actuated multi-plate clutch 11. In detail, an inner face 12 of the input shaft 5 adjacent the output shaft 6 is provided with a circumferential recess 13 slidably housing an annular portion 14 of a piston ring 15 carrying extension fingers 16 subjected to the action of a plurality of coil compression springs 17 urging the clutch to a non-drive position, each spring 17 being located within one of several circumferentially spaced pockets 18 provided around an extension 19 of the input shaft 5. The extension 19 also carries a plurality of plates 20 of friction material forming part of the clutch 11, these plates being interleaved with a plurality of annular plates 21 carried by the output shaft 6.

To ensure that a braking effect is provided immediately power to the electric motor 2 is cut off, the coupling 1 is also provided with a multi-plate brake 22. Some elements, in the form of a plurality of annular plates 23 are carried by the output shaft 6, while plates 24 of friction material are interleaved with the plates 23 and carried by the housing 4. The latter is also provided with a plurality of circumferentially spaced pockets 25 each housing a coil compression spring 26 operable against a piston 27 to urge the brake to an "on" condition. The piston 27 is displaceable with respect to the housing 4, against the action of the springs 26, by admission of pressure fluid to a chamber 28.

Pressure fluid (oil) for both the clutch 11 and the brake 22, is supplied by a working circuit 39 incorporating a pump 31, preferably of the swash plate type, located within the housing 4 and provided with a drive pinion 32 in mesh with a gear ring 33 carried by the extension 19. The working circuit 39 also incorporates fluid lines 29 and 30 to the clutch, brake and bearings. One pump output line 34 is connected to a solenoid operated valve 35 having line 36 to the clutch 11, line 37 to the brake 22 and return line 38 to a fluid tank. The pump 31 has an input shaft 40 carrying the drive pinion 32 and is of adjustable output, its control circuit 41 incorporates a pressure control valve 42 of the spool kind which is screw adjustable to vary the set pressure at which the pump 31 automatically increases or decreases its output (by suitable change in the swash plate angle of a swash plate pump) until the set pressure is achieved. If however the motor 2 is reversible, then as illustrated in FIG. 4, four non-return valves 43 are incorporated in the working circuit 39, so that the pump 31 can suck oil from the same source and deliver through the same pressure line, irrespective of the direction of rotation of the motor 2, the oil additionally being passed through a filter 44.

In the driving condition illustrated in FIG. 1, control of pressure fluid is effected by the solenoid valve 35. After the electric motor is switched on, this runs up to speed and a timing device, to serve as a pre-start warning to personnel, is activated, the timing device eventually energising the solenoid valve 35 to allow fluid flow to engage the clutch 11 and disengage the brake 22, the hydraulic fluid of both elements being operable against the action of their respective coil compression springs. Upon cut-off of power supply to the motor 2 the pump 31 does not stop instantly, but by de-energising the solenoid valve 35, pressure can be instantly relieved upon motor switch off from the line 37 to bring the brake 22 instantly into effect. In the braking condition illustrated in FIG. 2, pressure fluid is removed from both the clutch 11 and the brake 22, whereby the brake springs 26 are allowed to become effective to actuate the brake, and the clutch springs 17 are also allowed to become effective to disengage the plates 20 and 21.

What we claim is:

1. A transmission coupling for location between an electric motor and a gear box, comprising:
   (a) a rigid housing;
   (b) an input shaft rotatably supported within said housing;
   (c) an output shaft also rotatably supported within said housing;
   (d) a hydraulically actuated multi-plate clutch, at least one of said clutch plates being rigidly connected to said input shaft and at least one of said clutch plates being rigidly connected to said output shaft, said clutch being hydraulically operative to selectively engage the plates for transmitting torque between said input and output shaft;
   (e) a multi-plate brake, at least one brake plate being rigidly connected to said output shaft and at least one brake plate being rigidly supported by said housing, said brake being hydraulically operative to selectively engage and disengage the brake plates on the output shaft and housing to selectively inhibit rotational movement of said output shaft with respect to said housing;
   (f) a constant pressure hydraulic pump interconnected by a hydraulic circuit to said clutch and said brake for supplying hydraulic fluid at a constant pressure to effectuate operation of said clutch and said brake, whereby fluid output of the pump is automatically adjusted in response to fluid volume demanded by operation of said clutch and said brake; and
   (g) control valve means disposed in said hydraulic circuit intermediate said pump and the brake and clutch for controlling flow of hydraulic fluid from said pump to both said clutch and said brake.

2. A transmission coupling as claimed in claim 1, wherein said pump is of the swash plate type.

3. A transmission coupling as claimed in claim 1, wherein said pump incorporates a sensor to sense fluid pressure and to adjust the pump output accordingly.

4. A transmission coupling as claimed in claim 3, wherein said sensor takes the form of a control valve, which is adjustable so as to provide flexibility for differing service conditions.

5. A transmission coupling as claimed in claim 1, wherein said input and output shafts are co-axial.

6. A transmission coupling as claimed in claim 1, wherein said input shaft comprises a female formation adapted to receive a male output shaft from said electric motor.

7. A transmission as claimed in claim 1, wherein said output shaft comprises a female formation to receive a male shaft from said gearbox.

8. A transmission coupling as claimed in claim 1, wherein an inner face of said input shaft, in a location adjacent said output shaft, is provided with a circumferential recess interconnected by said hydraulic circuit to said pump, a piston ring partially located within said recess, said ring being displaceable upon the admission of hydraulic fluid to said recess, to operate said clutch, an extension provided on said input shaft, and plates of friction material carried by said extension, a plurality of axially spaced, annular plates carried by said output shaft, with which plates said friction plates are interleaved and brought into contact to operate said clutch.

9. A transmission coupling as claimed in claim 1, wherein said clutch plates are biased into a nonengaging position, the clutch being hydraulically operative to selectively engage the clutch plates.

10. A transmission coupling as claimed in claim 8, wherein an extension is provided on said input shaft around which extension a plurality of circumferentially spaced pockets are provided, with a coil compression spring housed in each said pocket and operable on said piston ring.

11. A transmission coupling as claimed in claim 1, wherein a plurality of circumferentially spaced pockets are located in a portion of said housing and a plurality of coil compression springs are located one in each of said pockets, with brake plates of friction material carried by said housing interleaved with a plurality of axially spaced, annular plates carried by said output shaft.

12. A transmission coupling as claimed in claim 1, comprising a piston displaceable with respect to said housing to selectively engage and disengage the brake plates on the output shaft and housing, said piston being biased toward a first position by said coil springs to engage the brake plates, and movable under the influence of pressurized fluid in the hydraulic circuit to a second position disengaging the brake plates.

13. A transmission coupling as claimed in claim 1, wherein said control valve is of an electrically operated type.

14. A transmission coupling as claimed in claim 1, wherein said pump is contained within said housing and driven by a pinion in mesh with a gear ring carried by said input shaft.

15. A transmission coupling as claimed in claim 1, wherein said hydraulic circuit incorporates four non-return valves.

16. A transmission coupling as recited in claim 1 wherein said brake plates connected to said output shaft and housing are biased into engagement to inhibit rotational movement of said output shaft with respect to said housing.

* * * * *